United States Patent
Miyoshi et al.

(10) Patent No.: US 10,851,252 B2
(45) Date of Patent: Dec. 1, 2020

(54) AQUEOUS INK COMPOSITION FOR WRITING INSTRUMENTS

(71) Applicant: MITSUBISHI PENCIL COMPANY, LIMITED, Tokyo (JP)

(72) Inventors: Kana Miyoshi, Kanagawa (JP); Kousuke Ogura, Kanagawa (JP); Akiko Hirayama, Kanagawa (JP)

(73) Assignee: Mitsubishi Pencil Company, Limited, Tokyo (JP)

( * ) Notice: Subject to any disclaimer, the term of this patent is extended or adjusted under 35 U.S.C. 154(b) by 29 days.

(21) Appl. No.: 16/325,903

(22) PCT Filed: Jun. 14, 2017

(86) PCT No.: PCT/JP2017/022003
§ 371 (c)(1),
(2) Date: Feb. 15, 2019

(87) PCT Pub. No.: WO2018/042818
PCT Pub. Date: Mar. 8, 2018

(65) Prior Publication Data
US 2019/0211220 A1    Jul. 11, 2019

(30) Foreign Application Priority Data
Aug. 29, 2016 (JP) .................. 2016-166619

(51) Int. Cl.
*C09D 11/17* (2014.01)
*B43K 7/00* (2006.01)
*B43K 8/02* (2006.01)
*C09D 11/18* (2006.01)

(52) U.S. Cl.
CPC ............... *C09D 11/17* (2013.01); *B43K 7/00* (2013.01); *B43K 8/02* (2013.01); *C09D 11/18* (2013.01)

(58) Field of Classification Search
None
See application file for complete search history.

(56) References Cited

U.S. PATENT DOCUMENTS

2005/0143486 A1* 6/2005 Yoshimura ............ C09D 11/18
523/160

FOREIGN PATENT DOCUMENTS

| EP | 0 960 916 A1 | 12/1999 |
|---|---|---|
| JP | 2000-136339 A | 5/2000 |
| JP | 2003-138193 A | 5/2003 |
| JP | 2003-306631 A | 10/2003 |
| JP | 2010-150331 A | 7/2010 |

* cited by examiner

*Primary Examiner* — Peter A Salamon
(74) *Attorney, Agent, or Firm* — Foley & Lardner LLP

(57) ABSTRACT

Provided is an aqueous ink composition for writing instruments, which enables desired colorfulness to be obtained easily. The aqueous ink composition for writing instruments according to the present invention contains: pigmented microspheres each having a matrix comprising water and a polymer, and a water-insoluble dye; and unpigmented microspheres.

14 Claims, No Drawings

AQUEOUS INK COMPOSITION FOR WRITING INSTRUMENTS

CROSS-REFERENCE TO RELATED APPLICATIONS

This application is the U.S. National Stage of PCT/JP2017/022003, filed Jun. 14, 2017, which claims priority to JP 2016-166619, filed Aug. 29, 2016.

FIELD

The present invention relates to an aqueous ink composition for writing instruments.

BACKGROUND

Dyes and pigments are known as the coloring components of aqueous inks for use in writing instruments such as aqueous felt-tip pens and aqueous ballpoint pens.

Inks using a dye are disadvantageous in that since the ink is water-soluble, written characters and lines can become blurry or can be erased due to sweat or water, whereby the written characters or lines become unreadable. The so-called "water resistance" of such inks is inferior. Furthermore, since the dye itself is inferior in light fastness, there is a problem that characters and lines can change over a long period of time. Inks using a pigment do not have problems with respect to water resistance and light fastness, but differ in material, size, specific gravity and the like depending on the type of pigment, resulting in a problem in that a different dispersion processes is necessary for each pigment. In particular, when pigments of different hues are mixed and toned to obtain a desired hue, the stability of the ink is often impaired due to the differences in the properties of the pigments. In order to solve such a problem, various inks colored with resin or microencapsulated using a dye or pigment have been proposed.

Patent document 1 discloses an ink composition for writing instruments comprising a non-discoloring pigment and a vehicle. Patent document 1 discloses that microcapsules containing a dye or pigment in a microcapsule wall membrane are used as the non-discoloring pigment.

CITATION LIST

Patent Literature

[Patent document 1]: JP2010-150331A

SUMMARY

Problem to be Solved by the Invention

Though the ink composition comprising the microcapsules described in Patent Literature 1 has advantages such as water resistance and light resistance, it is difficult to obtain a desired saturation, and as a result, the degree of freedom in attainable hues is limited.

Therefore, there is a need to provide an ink composition for writing instruments with which a desired saturation can be easily obtained.

Means for Solving the Problem

The present inventors have discovered as a result of rigorous investigation that the aforementioned problems can be solved by the following means, and have completed the present invention. Specifically, the present invention provides:

<1> An aqueous ink composition for writing instruments, comprising:
  water,
  colored microspheres each comprising a matrix composed of a polymer and a water-insoluble dye, and
  non-colored microspheres.
<2> The aqueous ink composition for writing instruments according to <1>, wherein the average particle diameter of the non-colored microspheres is 0.5 to 5.0 µm when measured by a laser diffraction method.
<3> The aqueous ink composition for writing instruments according to <1> or <2>, wherein the colored microspheres further comprise a resin having an OH group.
<4> The aqueous ink composition for writing instruments according to any one of <1> to <3>, wherein the non-colored microspheres include a matrix composed of a polymer.
<5> The aqueous ink composition according to <4>, wherein the polymer constituting the matrix of the colored microspheres and the polymer constituting the matrix of the non-colored microspheres are the same quality of polymer.
<6> The aqueous ink composition for writing instruments according to <5>, wherein the non-colored microspheres are composed of the same type of material as the colored microspheres except that a water-insoluble dye is not included therein.
<7> The aqueous ink composition for writing instruments according to any one of <1> to <6>, wherein the saturation $C^*a^*b$ value of the aqueous ink composition for writing instruments in the $L^*a^*b$ color system according to JIS Z8781 is not less than 140% the saturation $C^*a^*b$ value of an aqueous ink composition for writing instruments the same thereas but which does not comprise non-colored microspheres.
<8> A writing instrument,
  wherein the writing instrument at least comprises an ink reservoir, a writing part, and a gripping part, and
  wherein the aqueous ink composition according to any one of <1> to <7> is stored in the ink reservoir.

Effects of Invention

According to the present invention, an ink composition for writing instruments with which a desired saturation can be easily obtained can be provided.

DESCRIPTION OF EMBODIMENTS

<<Aqueous Ink Composition for Writing Instruments>>

The aqueous ink composition for writing instruments of the present invention comprises colored microspheres comprising water, a matrix composed of a polymer, and a water-insoluble dye, and non-colored microspheres.

The present inventors have found that a desired saturation can be easily obtained by configurating the aqueous ink composition for writing instruments as described above. Though not to be bound by theory, it is believed that the reason for this is because by including non-colored microspheres in the aqueous ink composition for writing instruments, (1) the non-colored microspheres block the gaps between the fibers on the surface of the paper, and as a result, the colored microspheres are less likely to settle between the fibers on the surface of the paper, and (2) the non-colored microspheres cover the paper surface, whereby reflection of visible light by the paper can be prevented.

The saturation C*a*b value of the aqueous ink composition for writing instruments of the present invention in the L*a*b color system according to JIS Z8781 can be 140% or more, 170% or more, or 200% or more of the saturation C*a*b value of an aqueous ink composition for writing instruments the same thereas but which does not comprise non-colored microspheres. The saturation C*ab value is represented by the following Formula using the a* value and b* value of the aqueous ink composition for writing instruments of the present invention.

$$C*ab\_(a*)^2+(b*)^2 \quad \text{[Math 1]}$$

The saturation C*ab value can be measured under, for example, the following conditions: Spectrophotometer (SC-T(P), Suga Testing Machines Company)
Optical Conditions: Diffuse illumination 8° received, d8 method (excludes specular reflection)
Light Source: 12V 50 W halogen lamp
Colorimetric Conditions: Illuminant D65, 10° Field of View
Measurement Area: 5φ (average of measurement at three locations)

Note that "the same thereas but which does not comprise non-colored microspheres" means replacing the quantity of non-colored microspheres with water.

The aqueous ink composition for a writing instrument of the present invention may also contain at least two types of colored microspheres. In this case, the matrix of one type of colored microspheres and the matrix of another type of colored microspheres are preferably composed with the same type of polymer. In addition, the water-insoluble dye of one type of colored microspheres and the water-insoluble dye of another type of colored microspheres may be different. In the present specification, "same type of polymer" means that monomers constituting the polymers are the same.

As a result of composing the matrices of the colored microspheres with the same type of polymer, parameters such as the material, size and specific gravity of the colored microspheres can be aligned to substantially the same extent, thereby facilitating uniform dispersion of the colored microspheres in the aqueous ink composition for a writing instrument and as a result thereof, easily allowing the obtaining of a desired hue by mixing colors.

The content ratio of colored microspheres in the aqueous ink composition for a writing instrument of the present invention can be 5 mass % or more, 7 mass % or more or 10 mass % or more and can be 45 mass % or less, 40 mass % or less or 35 mass % or less. If the content ratio of microspheres is less than 5 mass %, color force may be insufficient, while if the content ratio of microspheres exceeds 45 mass %, ink fluidity may decrease.

The content of non-colored microspheres in the aqueous in composition for writing instruments of the present invention can be 1 mass % or more, 3 mass % or more, or 5 mass % or more, and can be 25 mass % or less, 20 mass % or less, or 15 mass % or less. The saturation of the aqueous ink composition for writing instruments of the present invention can be adjusted by adjusting this content ratio.

The following provides an explanation of each constituent of the aqueous ink composition for a writing instrument of the present invention.

<Water>
The water can be ion exchange water or distilled water and the like.

<Colored Microspheres>
The colored microspheres each include a matrix and a water-insoluble dye. Furthermore, the colored microspheres may further include a resin having an OH group.

The content ratio of water-insoluble dye in the colored microspheres can be 10 mass % or more, 20 mass % or more or 30 mass % or more and can be 45 mass % or less, 40 mass % or less or 35 mass % or less. This content ratio can be calculated according to the formula: (parts by mass of water-insoluble dye)/{(parts by mass of water-insoluble dye)+(parts by mass of polymer)}×100.

Making the mean particle diameter of the colored microspheres when measured by laser diffraction to be 0.3 μm or more, 0.5 μm or more or 1.0 μm or more is preferable from the viewpoint of expressing a desired color force and preventing a phenomenon that causes drawn lines to become shiny and colors to fade on the back side of paper, while making the mean particle diameter to be 3.0 μm or less, 2.5 μm or less or 2.0 μm or less is preferable from the viewpoint of not causing handwriting to become blurred. Mean particle diameter as referred to here is the value of D50 as calculated by laser diffraction on the basis of volume.

{Matrix}
The matrix is composed with a polymer.
(Polymer)
The polymer that composes the matrices can be, for example, an epoxy polymer, melamine polymer, acrylic polymer, urethane polymer, urea polymer or combination thereof.

{Water-Insoluble Dye}
The water-insoluble dye is a dye that is insoluble in water at normal temperature, although a salt-forming dye, disperse dye or oil-soluble dye, for example, can be used, a salt-forming dye is used preferably from the viewpoint of chromogenicity.

Examples of salt-forming dyes that can be used include dyes having a chemical structure of azo-based, metal complex azo-based, anthraquinone-based or metal phthalocyanine-based dyes such as Valifast® Black 1807, Valifast® Blue 2620, Valifast® Brown 2402, Valifast® Green 1501, Valifast® Orange 2210, Valifast® Pink 2310, Valifast® Red 1355, Valifast® Violet 1701 or Valifast® Yellow 1101 sold by Orient Chemical Industries Company.

Examples of disperse dyes that can be used include at least one type of dye selected from C.I. Disperse Yellow 198, C.I. Disperse Yellow 42, C.I. Disperse Red 92, C.I. Disperse Violet 26, C.I. Disperse Violet 35. C.I. Disperse Blue 60 and C.I. Disperse Blue 87.

Examples of oil-soluble dyes that can be used include Oil Black 860. Oil Blue 613, Oil Brown BB, Oil Green 530, Oil Orange 201, Oil Pink 312, Oil Red 5B, Oil Scarlet 318 and Oil Yellow 105 sold by Orient Chemical Industries Company.

{Resin}
A resin having an OH group is included in the matrix. This resin can be dissolved in the organic solvents described below regarding the method for producing the aqueous ink composition for writing instruments. Furthermore, this resin can be a resin having a molecular weight of 400 or more, 500 or more, 600 or more, or 1000 or more.

Examples of resins having an OH group include terpene phenol resins, rosin phenol resins, alkyl phenol resins, phenol novolac resins, cresol novolac resins, butyral resins, polyvinyl alcohol resins, polyol-modified xylene resins, ethylene oxide-modified xylene resins, maleic acid resins, hydroxyl group-modified acrylic resins, hydroxyl group-modified styrene acrylic resins, carboxyl-modified acrylic resins, and carboxyl-modified styrene acrylic resins, etc.

Among the above resins having an OH group, resins having a phenolic OH group such as terpene phenol resins, rosin phenol resins, alkyl phenol resins, and phenol novolak resins, etc., are preferable from the viewpoint of increasing the saturation of the aqueous ink composition for writing instruments.

Among the resins having a phenolic OH group, terpene phenol resins are preferably used from the viewpoint of increasing the saturation of the aqueous ink composition for writing instruments. "Terpene phenol resins" means copolymers of terpene and phenol. "Terpene" refers to a group of compounds having a structure in which a plurality of isoprene units are bonded. Examples thereof include monoterpene ($C_{10}$), sesquiterpene ($C_{15}$), diterpene ($C_{20}$), sesterterpene ($C_{25}$), triterpene ($C_{30}$), and tetraterpene ($C_{40}$), etc. Furthermore, the phenol may be an unsubstituted phenol or an alkyl-substituted phenol.

The hydroxyl value of the resin having an OH group is preferably 50 KOHmg/g or more, 100 KOHmg/g or more, or 120 KOHmg/g or more, and 250 KOHmg/g or less, 200 KOHmg/g or less, or 180 KOHmg/g or less from the viewpoint of satisfactorily retaining the resin in the microspheres. "Hydroxyl value" means the milligram (mg) number of potassium hydroxide equivalent to the hydroxyl groups in a 1 g sample.

<Non-Colored Microspheres>

"Non-colored microspheres" means microspheres which are not colored, i.e., which do not include a dye or pigment.

For example, microspheres including a matrix composed of a polymer, transparent inorganic particles, etc., can be used as the non-colored microspheres. The polymers described above for the colored microspheres, olefin polymers, or combinations thereof can be used as the polymer.

The non-colored microspheres may be hollow or solid microspheres. However, solid microspheres are preferable from the viewpoint of suitably increasing the saturation of the aqueous ink composition for writing instruments of the present invention.

The polymer constituting the matrix of the non-colored microspheres and the polymer constituting the matrix of the colored microspheres are preferably the same quality of polymer. "Same quality of polymer" means, for example, when the matrix of the colored microspheres is constituted by a urethane polymer, the matrix of the non-colored microspheres is also constituted by a urethane polymer. It is not always necessary that these urethane polymers be the same type of polymer.

Among the non-colored microspheres composed of the same quality of polymer, the use of a non-colored microsphere composed of materials of the same type as colored microsphere except that it does not include a water-insoluble dye is preferable from the viewpoint of suitably improving the saturation of the aqueous ink composition for writing instruments of the present invention. Further, by using such non-colored microspheres, the colored microspheres and the non-colored microspheres are made to have almost the same material, size, specific gravity and the like, whereby uniform dispersion of the microspheres in the aqueous ink composition for writing instruments is easy. As a result, a desired hue can be easily obtained by color mixing. In particular, when the colored microspheres include a resin having an OH group, from the viewpoint of increasing the saturation of the aqueous ink composition for writing instruments, it is preferable that the non-colored microspheres also include a resin having an OH group of the same type.

From the viewpoint of suitably increasing the saturation of the aqueous ink composition for writing instruments of the present application, it is preferable that the average particle diameter of the non-colored microspheres, as measured by a laser diffraction method, be 0.5 μm or more, 1.0 μm or more, or 1.5 μm or more, and preferably 5.0 μm or less, 4.5 μm or less, or 4.0 μm or less from the viewpoint of preventing precipitation of particles and the inhibition of flowability of the ink. The average particle diameter is the value of D50 calculated by volume reference in the laser diffraction method.

<Other Components>

The aqueous ink composition for a writing instrument of the present invention may also contain various additives such as a corrosion inhibitor, preservative, pH adjuster, lubricant, humectant, resin or thickener such as a natural polysaccharide.

<<Writing Instrument>>

The writing instrument of the present invention comprises at least an ink reservoir, a writing portion and a held portion. The aqueous ink composition for a writing instrument of the present invention is stored in this ink reservoir. The writing instrument of the present invention may be a felt-tip pen or ballpoint pen.

In the present description, a "felt-tip pen" refers to a pen having a mechanism by which ink stored in the ink reservoir is supplied to a plastic writing portion by capillary phenomenon, and includes pens referred to as "marking pens" by a person with ordinary skill in the art. In addition, in the present description, a "ballpoint pen" refers to a pen having a mechanism by which ink stored in the ink reservoir is exuded from the ink reservoir by the rotation of a ball provided in the writing portion.

<Ink Reservoir>

The ink reservoir stores the aforementioned aqueous ink composition for a writing instrument.

Any arbitrary ink reservoir can be used as the ink reservoir provided it is able to store ink and supply ink to the writing portion.

<Writing Portion>

The writing portion may be composed of any arbitrary material corresponding to the application of the writing instrument. In the case the writing instrument of the present invention is a felt-tip pen, examples of the writing portion include those having a fiber core or plastic core. In the case the writing instrument of the present invention is a ballpoint pen, the writing portion can be a writing portion comprising a ballpoint pen tip on the tip thereof.

<<Method for Producing Aqueous Ink Composition for Writing Instruments>>

The method for producing the aqueous ink composition for writing instruments of the present invention can include a colored microsphere production step, a non-colored microsphere preparation step, and an ink composition preparation step.

<Colored Microsphere Production Step: Emulsion Polymerization Method>

The colored microsphere production step using emulsion polymerization comprises producing an oil phase, producing an aqueous phase, and mixing the oil phase and aqueous phase to emulsify the oil phase and then polymerize the oil phase components.

{Oil Phase}

The oil phase contains an organic solvent, water-insoluble dye and monomer or prepolymer. Multiple types of organic solvents may be contained.

This oil phase can be produced by heating the organic solvent to a prescribed temperature, and adding the water-insoluble dye thereto while stirring, followed by adding the monomer or prepolymer thereto and further optionally adding another organic solvent thereto.

(Organic Solvent)

Solubility of the organic solvent in water at 25° C. can be 0.1 g/100 g or more, 1 g/100 g or more, 3 g/100 g or more or 5 g/100 g or more and can be 40 g/100 g or less, 35 g/100 g or less, 30 g/100 g or less or 25 g/100 g or less.

This solubility is preferably 0.1 g/100 g or more, 1 g/100 g or more, 3 g/100 g or more or 5 g/100 g or more from the viewpoint of favorably dispersing the dye, and is preferably 15 g/100 g or less, 14 g/100 g or less, 13 g/100 g or less or 10 g/100 g or less from the viewpoints of inhibiting precipitation of dye and resin and obtaining favorable circularity.

Organic solvents such as phenyl glycol, benzyl alcohol, ethylene glycol monobenzyl ether or ethyl acetate can be used as organic solvent having solubility that satisfies the aforementioned ranges.

In addition, an organic solvent having solubility in water at 25° C. of less than 0.1 g/100 g may also be additionally used as organic solvent. Examples of such solvents include alkyl sulfonic phenyl ester, ethyl hexyl phthalate, tridecyl phthalate, ethyl hexyl trimellitate, diethylene glycol dibenzoate, dipropylene glycol dibenzoate and liquid xylene resin.

(Water-Insoluble Dye)

A water-insoluble dye listed as an example in relation to the colored microspheres can be used as the water-insoluble dye.

(Monomer or Prepolymer)

Various types of monomers or polymers are suitably selected for the monomer or prepolymer that composes the polymer corresponding to the particular objective. Examples of monomers or prepolymers that can be used include melamine monomers or prepolymers, epoxy monomers or prepolymers, acrylic monomers or prepolymers and isocyanate monomers or prepolymers.

Examples of melamine monomers or prepolymers that can be used include melamine, melamine cyanurate, ethylene dimelamine and methylol melamine.

Examples of epoxy monomers or prepolymers that can be used include allyl glycidyl ether and bisphenol A-epichlorhydrin prepolymer.

Examples of acrylic monomers or prepolymers that can be used include (meth)acrylic acid, methyl (meth)acrylate, ethyl (meth)acrylate, propyl (meth)acrylate, butyl (meth)acrylate, isobutyl acrylate, pentyl (meth)acrylate, hexyl (meth)acrylate and 2-ethylhexyl (meth)acrylate.

Examples of isocyanate monomers or prepolymers that can be used include hexamethylene diisocyanate, tolylene diisocyanate, diphenylmethane diisocyanate, xylylene diisocyanate, isophorone diisocyanate and isocyanate prepolymers.

{Aqueous Phase}

The aqueous phase can be produced by mixing water and a dispersant. Examples of dispersants that can be used include, but are not limited to, polyvinyl alcohol.

{Emulsification and Polymerization Step}

The step for emulsifying and then polymerizing the oil phase components can be carried out by adding the oil phase to the aqueous phase and emulsifying and mixing them using a homogenizer etc. while heating to a prescribed temperature.

{Other Steps}

The colored microsphere production step may also include other steps such as a step for classifying the colored microspheres.

<Preparation of Non-Colored Microspheres>

Preparation of the non-colored microspheres can be performed by preparing commercially available non-colored microspheres or by producing the non-colored microspheres by an optional method. In particular, it is preferable to produce the non-colored microspheres by the same method as described for the colored microsphere except that a water-insoluble dye is not used.

<Preparing Ink Composition>

Preparing the ink composition can be carried out according to a conventionally known method while mixing the resulting colored and non-colored microspheres and other components composing the aqueous ink composition for a writing instrument using a stirrer such as a disperser.

EXAMPLES

The present invention will be specifically described using the Examples and Comparative Examples. However, the present invention is not limited thereby.

<<Production of Aqueous Ink Composition>>
<Production of Colored Microspheres>
{Colored Microspheres A}
(Production of Oil Phase Solution)

2.4 parts by mass of a black oil-soluble dye (Valifast Blue 2620, sold by Orient Chemical Industries, Company) as the water-insoluble dye and 1.0 parts by mass of a terpene phenol resin (YS Polystar-K125, sold by Yasuhara Chemical Co., Ltd.) were added to 9.6 parts by mass of benzyl alcohol as the organic solvent while heating to 60° C. and were sufficiently dissolved. Next, 7.6 parts by mass of a biuret-modified hexamethylene diisocyanate (D-165N, sold by Mitsui Chemical Company) as a prepolymer was added thereto to produce an oil phase solution.

(Production of Water Phase Solution)

15 parts by mass of polyvinyl alcohol (PVA-205, sold by Kuraray Company) as a dispersant was dissolved in 200 parts by mass of distilled water while heating to 60° C. to produce a water phase solution.

(Emulsion Polymerization)

The oil phase solution was added to the 60° C. water phase solution and the mixture was emulsified and mixed by stirring with a homogenizer for 6 hours to complete polymerization. The obtained dispersion was centrifuged to collect microspheres, whereby colored microspheres A were obtained. The average particle diameter of the colored microspheres A was 1.0 μm. The raw material components of the colored microsphere A are summarized in Table 1 below.

{Colored Microspheres B}

Colored microspheres B were obtained in the same manner as the colored microspheres A except that the 2.4 parts by mass of water-insoluble dye (Valifast Blue 2620, sold by Orient Chemical Industries Company) was changed to 2.8 parts by mass of water-insoluble dye (Oil Pink 312, sold by Orient Chemical Industries Company), the 9.6 parts by mass of benzyl alcohol was changed to 11.5 parts by mass of ethylene glycol monobenzyl ether, the 1.0 parts by mass of terpene phenol resin (YS Polystar-K125, sold by Yasuhara Chemical Company) was changed to 0.8 parts by mass of terpene phenol resin (YS Polystar-K140, sold by Yasuhara Chemical Company), and the 7.6 parts by mass of biuret-modified hexamethylene diisocyanate (D-165N, sold by Mitsui Chemical Company) was changed to 7.2 parts by mass of an isocyanurate-modified pentane-1,5-diisocyanate (D-370N, sold by Mitsui Chemical Company). The average particle diameter of the colored microspheres B was 1.0 μm. The raw material components of the colored microspheres B are summarized in Table 1 below.

{Colored Microspheres C}

Colored microspheres C were obtained in the same manner as the colored microspheres A except that the 2.4 parts by mass of water-insoluble dye (Valifast Blue 2620, sold by Orient Chemical Industries Company) was changed to 4.0 parts by mass of water-insoluble dye (OSPI Yellow RY, sold by Orient Chemical Industries Company), the 9.6 parts by mass of benzyl alcohol was changed to 16.0 parts by mass of phenyl glycol, the 1.0 parts by mass of terpene phenol resin (YS Polystar-K125, manufactured by Yasuhara Chemical Company) was changed to 1.2 parts by mass of terpene phenol resin (YS Polystar-N125, manufactured by Yasuhara Chemical Company), and the 7.6 parts by mass of the biuret-modified hexamethylene diisocyanate (D-165N, sold by Mitsui Chemical Company) was changed to 8.4 parts by mass of a TMP adduct-modified xylylene diisocyanate (D-110N, sold by Mitsui Chemical Company). The average particle diameter of the colored microspheres C was 1.0 μm. The raw material components of the colored microspheres C are summarized in Table 1 below.

<Preparation of Non-Colored Microspheres>

{Non-Colored Microspheres A to C}

Non-colored microspheres A to C were prepared in the same manner as colored microspheres A to C except that no water-insoluble dye was used. The average particle diameters of all of the non-colored microspheres A to C were 0.9 μm.

{Non-Colored Microspheres D}

Acrylic particles (Artpearl J-4PY, sold by Negami Kogyo Company, average particle diameter 2.2 μm) were used as the non-colored microspheres D.

{Non-Colored Microspheres E}

Polyethylene particles (Chemipearl W500, sold by Mistui Chemical Company, average particle diameter 2.5 μm) were used as the non-colored microspheres E.

{Non-Colored Microspheres F}

Non-colored microspheres F were produced in the same manner as the non-colored microspheres C, except that the parts by mass of the polyvinyl alcohol (PVA-205, sold by Kuraray Company) in the water phase solution was changed to 45 parts by mass. The average particle diameter of the microspheres F was 0.6 μm.

{Non-Colored Microspheres G}

Urethane particles (MM-120TW, sold by Negami Kogyo Company, average particle diameter 2.0 μm) were used as the non-colored microspheres G.

{Non-Colored microspheres H}

Non-colored microspheres H were produced in the same manner the non-colored microspheres B, except that the parts by mass of the polyvinyl alcohol (PVA-205, sold by Kuraray Company) in the water phase solution was changed to 50 parts by mass. The average particle diameter of the microspheres H was 0.4 μm.

{Non-Colored Microspheres I}

Hollow plastic particles (SN-1055, Ropaque Company, average particle diameter 1.0 μm) were used as the non-colored microspheres I.

<Preparation of Ink Composition>

Examples 1 to 7

As shown in detail in Table 2 below, 100 parts by mass of each of the aqueous ink compositions of Examples 1 to 7 were produced using the above colored microspheres (5 parts by mass), the above non-colored microspheres (15 parts by mass), propylene glycol (5 parts by mass) as a solvent, and ion exchanged water (75 parts by mass).

Comparative Examples 1 to 4

As shown in detail in Table 2 below, 100 parts by mass of each of the aqueous ink compositions of Comparative Examples 1 to 4 were produced using the above colored microspheres (5 parts by mass), propylene glycol (5 parts by mass) as a solvent, and ion exchanged water (90 parts by mass).

Examples 8 to 13

As shown in detail in Table 3 below, 100 parts by mass of each of the aqueous ink compositions of Examples 8 to 13 were produced using the above colored microspheres (5 parts by mass), the above non-colored microspheres (18 parts by mass), propylene glycol (5 parts by mass) as a solvent, and ion exchanged water (90 parts by mass).

Comparative Example 5

As shown in detail in Table 3 below, 100 parts by mass of the aqueous ink composition of Comparative Example 5 was produced using the colored microspheres B (2 parts by mass), propylene glycol (5 parts by mass) as a solvent, and ion exchanged water (93 parts by mass).

<Production of Aqueous Ink Composition for Writing Instruments and Writing Instrument>

Example 14

As shown in detail in Table 4 below, 100 parts by mass of an aqueous ink composition for ballpoint pens was produced using the colored microspheres A (5 parts by mass), the non-colored microspheres A (15 parts by mass), xanthan gum (Keslan S, sold by Sanko Company, 0.18 parts by mass), phosphate ester (Plysurf A219B, sold by Daiichi Kogyo Company, 0.5 parts by mass), a preservative (Bioden 421, sold by Daiwa Chemical Industry Company, 0.2 parts by mass), benzotriazole (0.3 parts by weight) as a rust inhibitor, aminomethylpropanol (0.1 parts by mass) as a pH adjuster, propylene glycol (15 parts by mass) as a solvent, and ion exchanged water (63.72 parts by mass).

Next, a refill comprising a polypropylene ink storage tube (inner diameter 4.0 mm, length 113 mm), a stainless-steel tip (cemented carbide ball, ball diameter 0.5 mm), and a joint connecting the storage tube and the tip was filled with the above aqueous ink composition for ballpoint pens. Thereafter, an ink follower comprising mineral oil, polybutene, and an olefinic elastomer was charged in behind the ink. The refill was loaded into the shaft of a ballpoint pen (Signino UM-100, Mitsubishi Pencil Company), to prepare the aqueous ballpoint pen of Example 14.

Example 15

As shown in detail in Table 4 below, 100 parts by mass of an aqueous ink composition for felt-tip pens was prepared using the colored microspheres B (5 parts by mass), the non-colored microspheres B (15 parts by mass), a preservative (Bioden 421, sold by Daiwa Chemical Industry Co., Ltd., 0.2 parts by mass), aminomethylpropanol (0.1 parts by mass) as a pH adjuster, propylene glycol (3 parts by mass) as a solvent, and ion exchanged water (73.7 parts by mass).

Next, a pen body PM-120T (product name "Proky", pen cores: ultra-fine core (POM resin core) and thin fine round core (PET fiber core), the same is true hereinafter) sold by Mitsubishi Pencil, Company, was filled with the above aqueous ink composition for felt-tip pens to produce the felt-tip pen of Example 15. Evaluation the felt-tip pen was performed with the fine round core.

<<Evaluation>>

The aqueous ink compositions of Examples 1 to 13 and Comparative Examples 1 to 5 thus produced were applied to Clark Kent paper (160 kg weight) using a bar coater (RDS 06, Yasuda Seiki Seisakusho Company).

Furthermore, using the thus produced ballpoint pen of Example 14 and felt-tip pen of Example 15, the interior of a square having a side length of 2 cm was colored on Clark Kent paper (160 kg weight).

Next, the brightness and saturation of the applied inks were measured under the following conditions:
Spectrophotometer (SC-T (P), Suga Testing Machine Company)
Optical conditions: diffuse illumination 8° received, d8 method (excludes specular reflection)
Light source: 12V 50 W halogen lamp
Colorimetric conditions: Illuminant D65, 10 ° FOV
Measurement area: 5φ (average of measurement at three locations)

The results are shown in Tables 2 to 4.

TABLE 1

|  |  | Microspheres | | |
|---|---|---|---|---|
|  |  | A | B | C |
| Dye (Parts by Mass) | Blue: Valifast Blue 2620 (Orient Chemical Industries Company) | 2.4 | — | — |
|  | Red: Valifast Red 1355 (Orient Chemical Industries Company) | — | 2.8 | — |
|  | Yellow: Valifast Yellow 1101 (Orient Chemical Industries Company) | — | — | 4 |
| Solvent (Parts by Mass) | Benzyl Alcohol | 9.6 | — | — |
|  | Ethylene Glycol Monobenzyl Ether | — | 11.5 | — |
|  | Phenyl Glycol | — | — | 16 |
| Polymer Component (Parts by Mass) | Hexamethylene Diisocyanate Biuret-Modified Product | 7.6 | — | — |
|  | Pentane-1,5-Diisocyanate Isocyanurate-Modified Product | — | 7.2 | — |
|  | Xylylene Diisocyanate TMP Adduct-Modified Product | — | — | 8.4 |
| Resin (Parts by Mass) | Terpene Phenol Resin YS Polystar-N125 (OH Value: 150) | — | — | 1.2 |
|  | Terpene Phenol Resin YS Polystar-K125 (OH Value: 200) | 1 | — | — |
|  | Terpene Phenol Resin YS Polystar-K140 (OH Value: 200) | — | 0.8 | — |

TABLE 2

|  |  | Example 1 | Example 2 | Comparative Example 1 | Example 3 | Example 4 | Comparative Example 2 |
|---|---|---|---|---|---|---|---|
| Content (Parts by Mass) | Colored Microspheres | 5 | 5 | 5 | 5 | 5 | 5 |
|  | Non-Colored Microspheres | 15 | 15 | 0 | 15 | 15 | 0 |
|  | Water-Soluble Organic Solvent | 5 | 5 | 5 | 5 | 5 | 5 |
|  | Water | 75 | 75 | 90 | 75 | 75 | 90 |
| Colored Microspheres Details | Type | A | A | A | B | B | B |
|  | Particle Diameter (μm) | 1.0 | 1.0 | 1.0 | 1.0 | 1.0 | 1.0 |
| Non-Colored Microspheres Details | Type | A | D | — | B | E | — |
|  | Particle Diameter (μm) | 0.9 | 2.2 | — | 0.9 | 2.5 | — |
|  | Saturation | 48 | 40 | 22 | 76 | 60 | 29 |
|  | Brightness | 63 | 66 | 82 | 61 | 66 | 81 |

|  |  | Example 5 | Example 6 | Comparative Example 3 | Example 7 | | Comparative Example 4 | |
|---|---|---|---|---|---|---|---|---|
| Content (Parts by Mass) | Colored Microspheres | 5 | 5 | 5 | 3.5 | 1.5 | 3.5 | 1.5 |
|  | Non-Colored Microspheres | 15 | 15 | 0 | 15 | | 0 | |
|  | Water-Soluble Organic Solvent | 5 | 5 | 5 | 5 | | 5 | |
|  | Water | 75 | 75 | 90 | 75 | | 90 | |
| Colored Microspheres Details | Type | C | C | C | A | C | A | C |
|  | Particle Diameter (μm) | 1.0 | 1.0 | 1.0 | 1.0 | 1.0 | 1.0 | 1.0 |
| Non-Colored Microspheres Details | Type | C | F | — | A | | — | |
|  | Particle Diameter (μm) | 0.9 | 0.6 | — | 0.9 | | — | |
|  | Saturation | 70 | 60 | 30 | 50 | | 25 | |
|  | Brightness | 88 | 89 | 91 | 70 | | 80 | |

*Non-colored microspheres A to C are identical to microspheres A to C except that a dye is not included therein.

TABLE 3

|  |  | Example 8 | Example 9 | Example 10 | Example 11 | Example 12 | Example 13 | Comparative Example 5 |
|---|---|---|---|---|---|---|---|---|
| Content (Parts by Mass) | Colored Microspheres | 2 | 2 | 2 | 2 | 2 | 2 | 2 |
|  | Non-Colored Microspheres | 18 | 18 | 18 | 18 | 18 | 18 | 0 |
|  | Water-Soluble Organic Solvent | 5 | 5 | 5 | 5 | 5 | 5 | 5 |
|  | Water | 90 | 90 | 90 | 90 | 90 | 90 | 93 |
| Colored Microspheres Details | Type | B | B | B | B | B | B | B |
|  | Particle Diameter (μm) | 1.0 | 1.0 | 1.0 | 1.0 | 1.0 | 1.0 | 1.0 |
| Non-Colored Microspheres Details | Type | B | D | E | G | H | I | — |
|  | Particle Diameter (μm) | 0.9 | 2.2 | 2.5 | 2.0 | 0.4 | 1.0 | — |
|  | Saturation | 72 | 56 | 55 | 62 | 35 | 55 | 21 |
|  | Brightness | 65 | 71 | 72 | 70 | 75 | 72 | 83 |

|  |  | Example 14 | Example 15 |
|---|---|---|---|
| Content (Parts by Mass) | Colored Microspheres | 5 | 5 |
|  | Non-Colored Microspheres | 15 | 15 |
|  | Thickener | 0.18 | — |
|  | Phosphate Ester | 0.5 | — |
|  | Preservative | 0.2 | 0.2 |
|  | Rush Inhibitor | 0.3 | — |
|  | pH Adjuster | 0.1 | 0.1 |
|  | Water Soluble Organic Solvent | 15 | 3 |
|  | Water | 63.72 | 73.7 |
| Colored Microspheres Details | Type | A | B |
|  | Particle Diameter (um) | 1.0 | 1.0 |
| Non-Colored Microspheres Details | Type | A | B |
|  | Particle Diameter (um) | 0.9 | 0.9 |
|  | Saturation | 50 | 77 |
|  | Brightness | 61 | 65 |

*Non-colored microspheres B are identical to colored microspheres B except that a dye is not included therein.

From Table 2, with reference to Examples 1 and 2 and Comparative Example 1, in which colored microspheres A of the same color were used, it can be understood that the water based ink compositions of Examples 1 and 2, in which non-colored microspheres were included, had a saturation value which was 150% or more, and in particular, the aqueous ink composition of Examples 1, in which the non-colored microspheres A were included, had a saturation value which was 200% or more as compared to the aqueous ink composition of Comparative Example 1, in which non-colored microspheres were not included. Furthermore, a similar trend can be seen between Examples 3 to 7 and Comparative Examples 2 to 4 shown in Table 2 and between Examples 8 to 13 and Comparative Example 5 shown in Table 3.

From Table 3, with reference to Examples 8 to 11, it can be understood that the aqueous ink compositions of Examples 8 and 11, in which the non-colored microspheres were composed of a urethane polymer which was of the same quality of polymer as the colored microspheres, achieved a high saturation, and in particular, Example 8, in which the non-colored microspheres B were used, achieved a particularly high saturation as compared to the aqueous ink compositions of Examples 9 and 10, in which the non-colored microspheres were compose of a polymer which was not of the same quality of polymer as the colored microspheres.

With reference to Examples 11 and 12, it can be understood that the saturation of the aqueous ink composition of Example 11, in which the particle diameter of the non-colored microspheres was in the range of 0.5 μm to 5.0 μm, was high. Further, it can be understood that the saturation of the aqueous ink composition of Example 8, in which the non-colored microspheres were solid microspheres, was high as compared with Examples 8 and 13.

Further, from Table 4, with reference to Examples 14 and 15, it can be seen that these aqueous ink compositions for writing instruments had a saturation and brightness equivalent to Examples 1 and 3, in which the same microspheres were used, and thus, the high saturation due to the non-colored microspheres of the aqueous ink compositions of Examples 1 to 13 is similarly achieved by these aqueous ink compositions for writing instruments.

The invention claimed is:

1. An aqueous ink composition for writing instruments, comprising:
   water,
   colored microspheres each comprising a matrix composed of a polymer, a resin having an OH group and a water-insoluble dye, and
   non-colored microspheres.

2. The aqueous ink composition for writing instruments according to claim 1, wherein the average particle diameter of the non-colored microspheres is 0.5 to 5.0 μm when measured by a laser diffraction method.

3. The aqueous ink composition for writing instruments according to claim 1, wherein the non-colored microspheres include a matrix composed of a polymer.

4. The aqueous ink composition according to claim 3, wherein the polymer constituting the matrix of the colored microspheres and the polymer constituting the matrix of the non-colored microspheres are the same quality of polymer.

5. The aqueous ink composition for writing instruments according to claim 4, wherein the non-colored microspheres are composed of the same type of material as the colored microspheres except that a water-insoluble dye is not included therein.

6. The aqueous ink composition for writing instruments according to claim 1, wherein the saturation $C^*a^*b$ value of the aqueous ink composition for writing instruments in the $L^*a^*b$ color system according to JIS Z8781 is not less than 140% the saturation $C^*a^*b$ value of an aqueous ink composition for writing instruments the same thereas but which does not comprise non-colored microspheres.

7. A writing instrument,
wherein the writing instrument at least comprises an ink reservoir, a writing part, and a gripping part, and
wherein the aqueous ink composition according to claim 1 is stored in the ink reservoir.

8. An aqueous ink composition for writing instruments, comprising:
water,
colored microspheres each comprising a matrix composed of a polymer and a water-insoluble dye, and
non-colored microspheres,
wherein the saturation $C^*a^*b$ value of the aqueous ink composition for writing instruments in the $L^*a^*b^*$ color system according to JIS Z8781 is not less than 140% the saturation $C^*a^*b$ value of an aqueous ink composition for writing instruments the same thereas but which does not comprise non-colored microspheres.

9. The aqueous ink composition for writing instruments according to claim 8, wherein the average particle diameter of the non-colored microspheres is 0.5 to 5.0 μm when measured by a laser diffraction method.

10. The aqueous ink composition for writing instruments according to claim 8 wherein the colored microspheres further comprise a resin having an OH group.

11. The aqueous ink composition for writing instruments according to claim 8, wherein the non-colored microspheres include a matrix composed of a polymer.

12. The aqueous ink composition according to claim 11, wherein the polymer constituting the matrix of the colored microspheres and the polymer constituting the matrix of the non-colored microspheres are the same quality of polymer.

13. The aqueous ink composition for writing instruments according to claim 12, wherein the non-colored microspheres are composed of the same type of material as the colored microspheres except that a water-insoluble dye is not included therein.

14. A writing instrument,
wherein the writing instrument at least comprises an ink reservoir, a writing part, and a gripping part, and
wherein the aqueous ink composition according to claim 8 is stored in the ink reservoir.

* * * * *